United States Patent [19]
Döring

[11] Patent Number: 5,428,273
[45] Date of Patent: Jun. 27, 1995

[54] COMMUTATION CIRCUIT FOR A COLLECTORLESS DIRECT CURRENT MOTOR

[75] Inventor: Günther Döring, Würselen, Germany

[73] Assignee: U.S. Philips Corporation, New York, N.Y.

[21] Appl. No.: 181,646

[22] Filed: Jan. 13, 1994

[30] Foreign Application Priority Data

Jan. 14, 1993 [DE] Germany .................. 43 00 760.0

[51] Int. Cl.$^6$ .............................................. H02K 29/00
[52] U.S. Cl. ....................................... 318/138; 318/254; 318/439
[58] Field of Search .................. 318/254, 138, 439, 811

[56] References Cited

U.S. PATENT DOCUMENTS

| | | | |
|---|---|---|---|
| 4,651,067 | 3/1987 | Ito et al. ............................. | 318/254 |
| 4,752,724 | 6/1988 | Radziwill et al. .................. | 318/254 |
| 5,057,753 | 10/1991 | Leuthold et al. ................... | 318/254 |
| 5,227,704 | 7/1993 | Erdman ............................... | 318/254 |
| 5,229,693 | 7/1993 | Futami et al. ...................... | 318/254 |

*Primary Examiner*—William M. Shoop, Jr.
*Assistant Examiner*—Karen Masih
*Attorney, Agent, or Firm*—Edward Blocker

[57] ABSTRACT

A circuit arrangement is described for commutating a collectorless direct current motor without a commutation sensor, the motor comprising at least two windings (608, 609, 610), in which arrangement the motor current is caused to commutate from one winding to the next winding in the direction of motion of the direct current motor by a pulse-shaped shift signal (sh) which signal is derived from an induced voltage (ui) in the direct current motor reaching a reference voltage (Ur).

Such a circuit arrangement is to be improved in that erroneous commutations with diode pulses having flat trailing edges are avoided.

According to the invention this is achieved in that the shift signal (sh) has adjustable pulse intervals (td1, td2) which depend on the speed of the direct current motor, in that the pulses of the shift signal (sh) cover at least the time intervals in which transient effects caused by the commutation occur in the induced voltage (ui), and in that the pulses of the shift signal (sh) are used for suppressing transient effects caused by the commutation and occurring in the induced voltage (ui).

3 Claims, 6 Drawing Sheets

COMMUTATION CIRCUIT FOR A COLLECTORLESS DIRECT CURRENT MOTOR

BACKGROUND OF THE INVENTION

1. Field of the Invention

The invention relates to a circuit arrangement for commutating a collectorless direct current motor without a commutation sensor, the motor comprising at least two windings, in which arrangement the motor current is caused to commutate from one winding to the next winding in the direction of motion of the direct current motor by a pulse-shaped shift signal which signal is derived from an induced voltage in the direct current motor reaching a reference voltage.

The invention further relates to a direct current motor comprising such a circuit arrangement.

2. Description of the Related Art

DE-OS 36 02 227 has disclosed a commutation circuit for a collectorless direct current motor without a commutation sensor and comprising a stator with a three-phase system and a permanent-magnet rotor. The state of commutation of the motor is determined on the basis of the voltages induced in the stator windings. A comparison signal is generated indicating whether a measuring voltage and a nominal-phase signal that depends on the state of commutation have the same sign. This comparison signal is suppressed in the period of time when transient effects with possible spurious zero crossings occur in the windings. In response to the comparison signal the motor is advanced by one commutation step if the sign of the measuring voltage does not correspond to the sign defined by the nominal-phase signal. In addition, DE-PS 37 10 509 has disclosed a commutation method for a direct current motor in which method instants at which the commutation is advanced are derived from a comparison of a voltage induced in a winding to a reference voltage, the commutation being delayed relative to the instant at which the induced voltage has reached the reference voltage by a given number of tacho-pulses from a tacho-generator connected to the motor.

In the circuit arrangements described in said publications a shift signal is generated which causes the motor to advance by one commutation step. This shift signal is also used for suppressing transient effects in the stator windings which effects are caused by the commutation and for suppressing the correlated error information signals which relate to the position of the rotor. The shift signal is thus to be instrumental in ensuring that only the sections of the induced voltages depending on the speed are evaluated. In DE-OS 36 02 227 a circuit arrangement is described for this purpose in which arrangement the shift signal is formed by a signal whose period depends on the angle of current flow of the diodes which compensate for the transient effects during commutation, and a constant period added thereto.

However, it appears that this method fails with motors in which the trailing edge of the diode pulse occurring in the measuring voltage presents an extremely flat pattern, so that after the whole blocking period i.e. at the end of the shift signal, the conduction of the diode has not yet decayed and thus the measuring voltage has a value which, when compared to the reference voltage, presents an error information signal and may thus cause an erroneous commutation to take place.

SUMMARY OF THE INVENTION

It is an object of the invention to improve a circuit arrangement for commutating a collectorless direct current motor of the type defined in the opening paragraph, in that the erroneous commutations described hereinbefore no longer occur and thus a perfectly running motor is achieved also under the operating condition described.

According to the invention this object is achieved with a circuit arrangement of the type defined in the opening paragraph, in that the shift signal has adjustable pulse intervals which depend on the speed of the direct current motor, in that the pulses of the shift signal cover at least the time intervals in which transient effects caused by the commutation occur in the induced voltage, and in that the pulses of the shift signal are used for suppressing transient effects caused by the commutation and occurring in the induced voltage.

Thus, according to the invention the periods of time during which the induced voltage is suppressed are thus simply adjusted only by the speed of the direct current motor to avoid interference caused by transient effects when the induced voltage is evaluated. This provides both a defined shift signal and the certainty that erroneous commutations caused by the transient effects are excluded. The invention eliminates in a simple manner the problem of determining the exact period of time of the transient effects, which effects may also have certain variations.

Preferably, the pulse durations of the shift signal can be changed to fixed predeterminable values in response to the speed of the direct current motor. An extremely simple circuit arrangement then arises in that the overall range of the speed of the direct current motor is subdivided into two sections, the pulse durations of the shift signal for the lower speed range which adopt a predeterminable high value and those for the remaining speed range up to the idling speed which adopt a predeterminable low value. Accordingly, the speed range can be subdivided into three or more sections and the pulse durations can appropriately be changed to three or more fixed predeterminable values.

The advantages of the circuit arrangement according to the invention are especially noticeable if the trailing edges of so-called diode pulses occurring in the induced voltage after each commutation present a very flat pattern, for example, at low speed. These diode pulses represent a substantial part of the transient effects. If the transient effects are not completely suppressed in the induced voltage, they may lead to a corruption of the comparison of this induced voltage with the reference voltage, which leads to said erroneous commutations. It is possible, it is true, to eliminate a slight interference in the induced voltage by increasing a tolerance range of that arrangement which is to perform the comparison with the reference voltage. This increase of the tolerance range, however, is disadvantageous in that, when the direct current motor starts running, the induced voltage is too small to reach the reference voltage level and cause a commutation to take place which is necessary for the starting of the motor. The motor does not start then or remains at a standstill after a forced stall.

The circuit arrangement according to the invention avoids these disadvantages because said range of tolerance can be kept small and thus the induced voltage can also be perfectly evaluated in the cases where it presents low values because of a low motor speed or at the start.

In a further embodiment the circuit arrangement according to the invention is combined with a control circuit for commutating a collectorless direct current motor without a commutation sensor, the motor comprising a permanent-magnet rotor or stator with an arbitrary number of pole pairs and an associated stator or rotor with at least two windings which form a multiphase system, each phase of which system can be switched to the negative and/or positive pole of a voltage source by electronic switch elements in dependence on voltages induced in the windings by the permanent-magnet field of the rotor for the motor to perform commutation steps on the basis of each state of commutation, whereas in motors without a starpoint or without an external starpoint a starpoint voltage is continuously calculated while always the induced voltage of the winding not connected to the voltage source is taken into consideration for determining the instants at which the commutation is advanced, and the commutation is triggered once this induced voltage has reached the reference voltage level (zero crossing), which level represents a zero level of the induced voltage.

Preferably, between each zero crossing and the advancing instant of the commutation caused by this zero crossing, a predeterminable delay interval is to be inserted in sofar the commutation has not started directly at the zero crossing, but is shifted in time relative to this zero crossing. The period of time of the delay interval is attuned to the structural shape and the speed of the motor that is to be reached.

In another embodiment of the circuit arrangement according to the invention the following operations are performed in the control circuit:

A measuring voltage is calculated by subtracting the external or calculated starpoint voltage from a signal which signal is formed from the intervals of the winding voltages in which intervals the windings are not connected to the direct current source by electronic switch elements, A nominal-phase signal is generated which defines the correct sign of the measuring voltage for each occurring state of commutation of the motor, A comparison signal is generated which denotes whether the actually occurring sign of the measuring voltage and the sign defined by the nominal-phase signal are the same or different, and which comparison signal is triggered at each zero crossing, A pulse of the shift signal is generated at the end of the delay interval after the comparison signal has been triggered by the zero crossing.

In above embodiment of the circuit arrangement according to the invention the sign of the measuring voltage is determined after a comparison with the reference voltage. This reference voltage is advantageously switchable, so that in response to the level of the nominal-phase signal it adopts a first or a second value situated symmetrically around a reference potential (zero potential). The tolerance range between this reference potential and the first or second value is used for suppressing slight interference and for avoiding oscillations in the control circuit. For this purpose the reference voltage can be changed by the nominal-phase signal.

Further advantageous embodiments of the circuit arrangement according to the invention are defined in the dependent claims.

BRIEF DESCRIPTION OF THE DRAWINGS

Embodiments of the invention are shown in the drawing and will be further described hereinbelow, in which.

DESCRIPTION OF THE PREFERRED EMBODIMENTS

Figure 1:
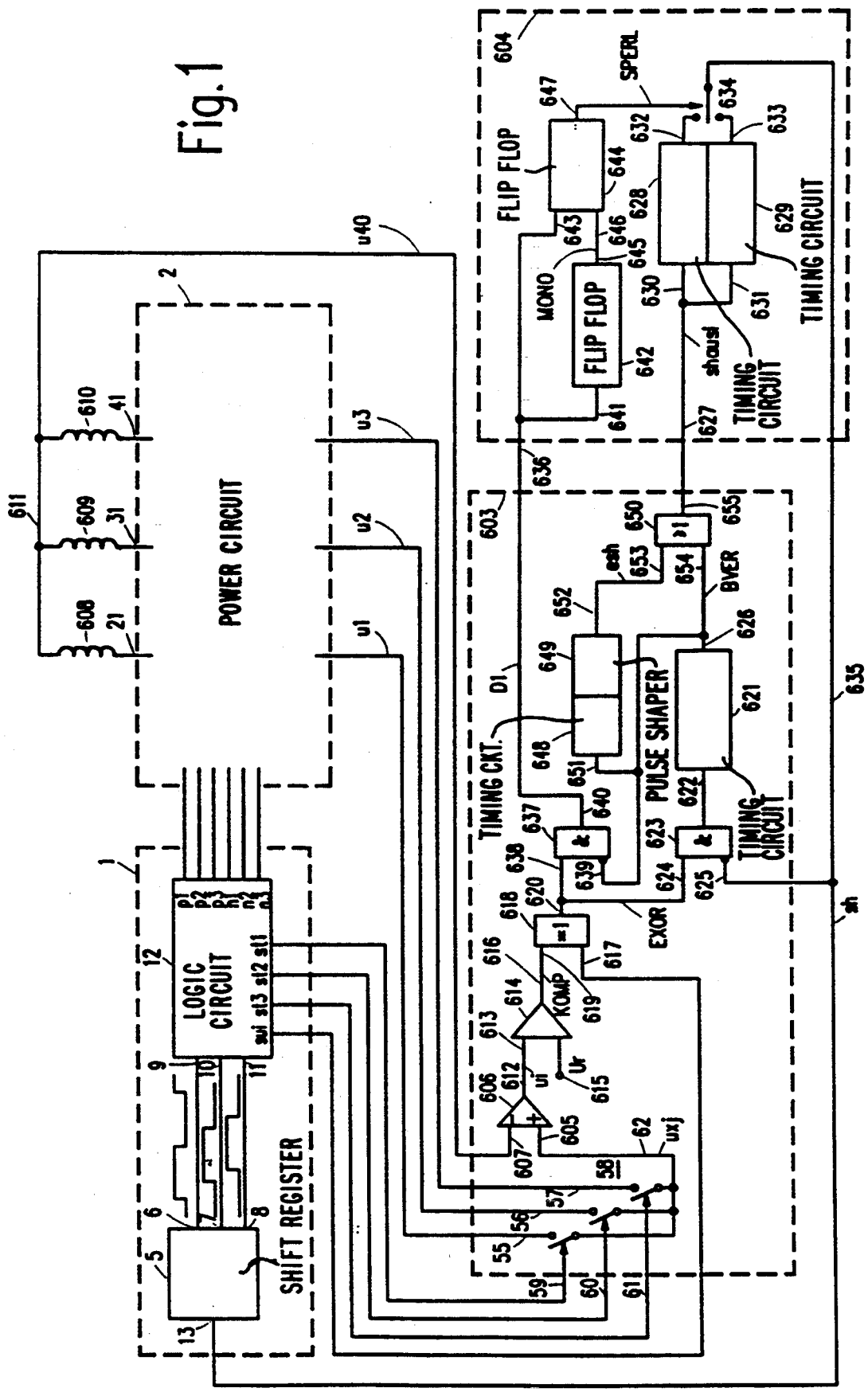
FIG. 1 shows the block diagram of an embodiment of the invention.

FIG. 1 shows as an embodiment of the invention a circuit arrangement parts of which are known from DE-OS 36 02 227 A1 while a control circuit embodying the invention is used as a modification. The circuit arrangement as shown in FIG. 1 is divided into a signal shaping circuit 1, a power circuit 2, a position sensing circuit 603 and a shift signal generator stage 604. Structure and function of the signal shaping circuit 1 and of the power circuit 2 of the present application are identical with the corresponding modules known from DE-OS 36 02 227 A1, so that reference will be made to the corresponding embodiments of DE-OS 36 02 227 A1 to avoid repetitions. Like circuit components and signals are denoted by like reference characters.

Figure 2:
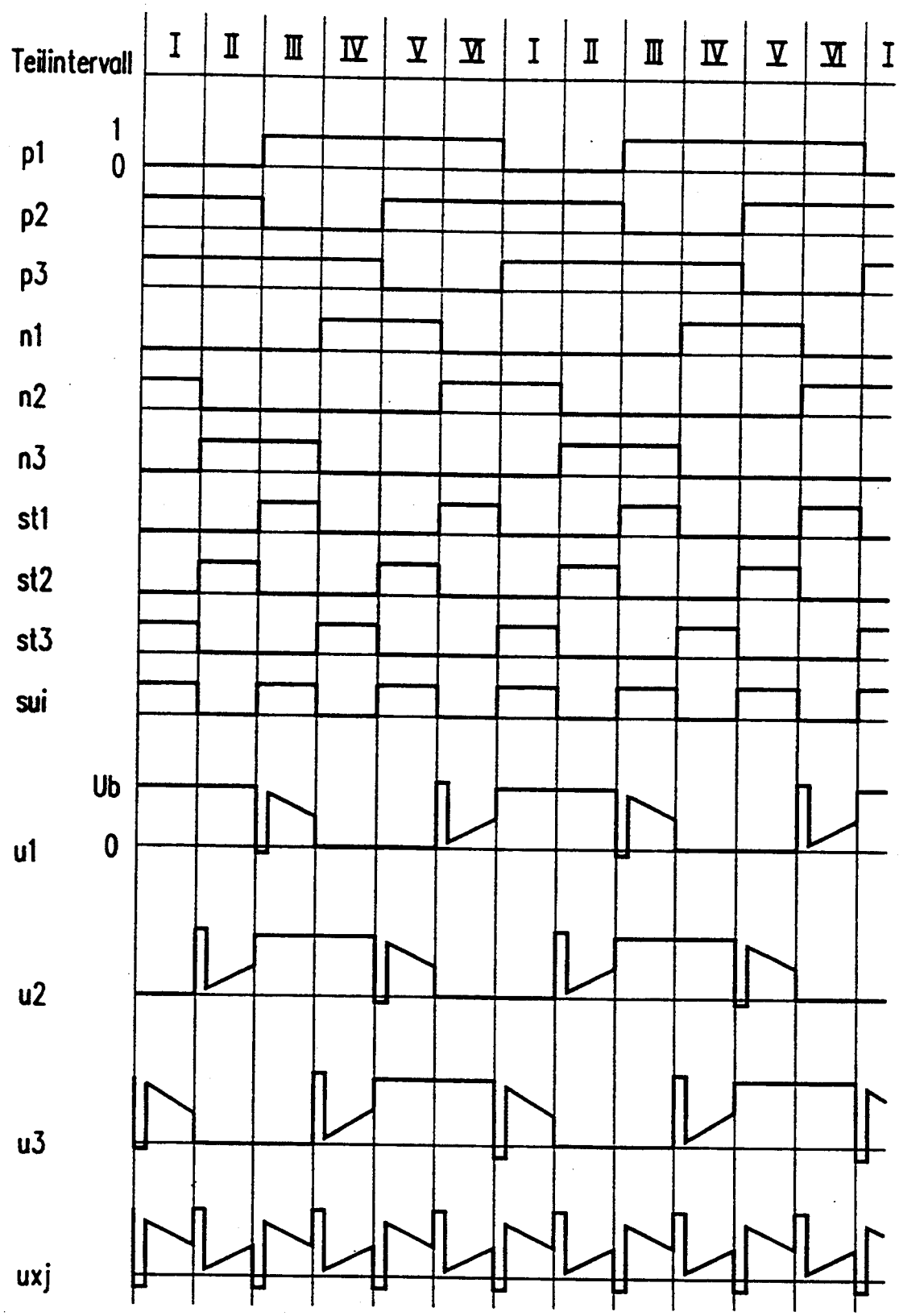
FIGS. 2 and 3 show signal variations of the circuit arrangement shown in FIG. 1.
Figure 5:
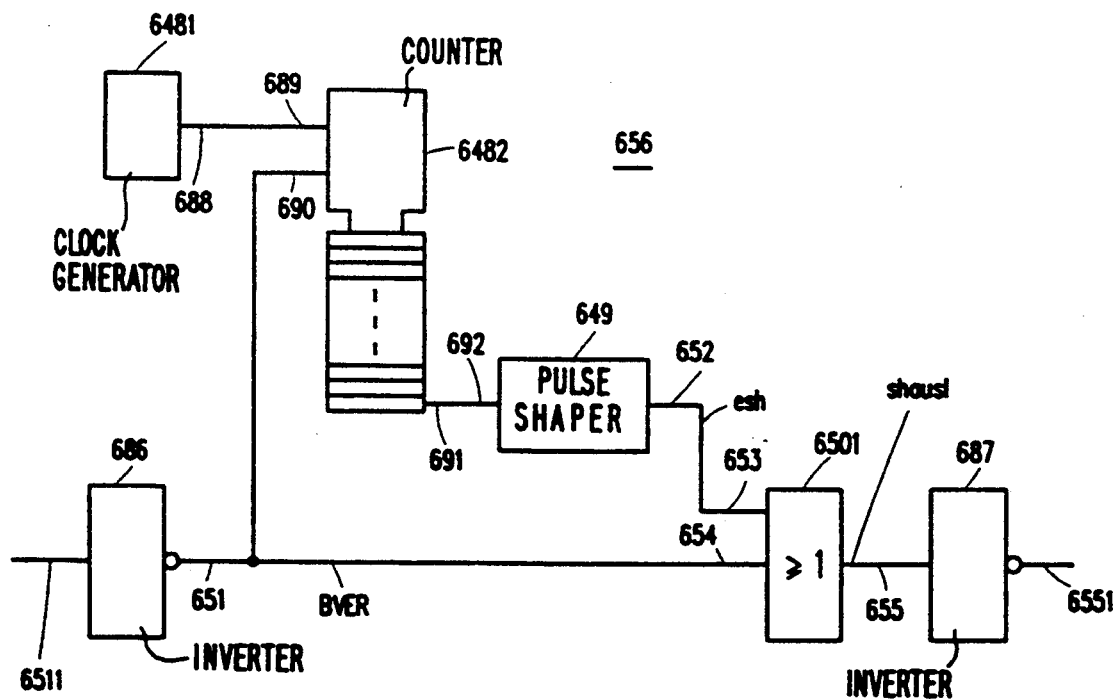
FIG. 5 shows an embodiment for a completion of the circuit shown in FIG. 4.

FIG. 2 shows the time diagrams already known from DE-OS 36 02 227 A1, FIG. 5, of the signals (voltages) appearing at the terminals of the signal shaping circuit 1 and of the power circuit 2 for a period of time corresponding to two electrical periods of the rotor of the direct current motor and also carrying the reference characters already known from DE-OS 36 02 227 A1. Each time interval corresponding to an electrical period of the rotor of the direct current motor is subdivided into subintervals I to VI in accordance with the operation of a three-phase motor. For the switch signals p1 to n3, the control signals st1 to st3 and the nominal-phase signal sui are shown logic "0" and "1" values; for the winding voltages u1, u2 and u3 and the signal uxj, which is formed by the sub-intervals of the voltages u1 to u3 during which sub-intervals the associated windings are not connected to the voltage source and during which sub-intervals the transient effects and thereafter the induced voltages occur, is shown the voltage Ub produced by the voltage source is shown.

The position sensing circuit 603 comprises an analog multiplexer 58 whose inputs 55 to 57 are fed with the winding voltages u1, u2, u3 respectively, produced by the power circuit 2, and whose further inputs 59, 60, 61 are supplied with the control signals st1, st2 and st3 respectively. The analog multiplexer 58 has similar structure and operation to the analog multiplexer 58 described in DE-OS 36 02 227 A1. Its output 62 presents the signal uxj.

The output 62 of the analog multiplexer 58 is connected to a non-inverting input 605 of an operational amplifier 606 whose inverting input 607 is supplied with the starpoint voltage u40 from starpoint 611 of three motor windings 608, 609, 610, which voltage is measured directly at the starpoint 611 in the present embodiment. In a variation in accordance with the embodiment known from DE-OS 36 02 227 A1 it is possible to calculate this starpoint voltage u40 from the winding voltages u1 to u3, cf. the analog arithmetic circuit 54 in that embodiment.

The output 612 of the operational amplifier 606 presents the difference between the starpoint voltage u40 and the signal uxj from the output 62 of the analog multiplexer 58, which difference is referenced the measuring voltage ui. It corresponds to the voltage induced in the windings 608 to 610.

The measuring voltage ui is fed to a measuring voltage input 613 of a comparator 614 which comparator is fed with the reference voltage Ur at a reference voltage input 615. The output 616 of the comparator 614 presents a sign signal KOMP which shows by an appropriate logic "1" and "0" whether the measuring voltage ui relative to the level of the reference voltage Ur is positive or negative respectively.

Since the measuring voltage ui adopts the value 0 when the direct current motor has stopped, a comparator arrangement, for example, comparator 614, which is to switch over when the measuring voltage ui crosses zero, could adopt an undefined state or start oscillating respectively, when the motor has stopped. For this reason not a voltage with an exact zero level is used as a reference voltage Ur, but the reference voltage Ur slightly deviates from the zero level by a value which also forms the tolerance range for suppressing interference in the induced voltage. The sign of the reference voltage Ur which may be slightly shifted positively or negatively relative to the zero level, as desired, is then changed in dependence on the state of commutation, in that the reference voltage Ur is positive if the measuring voltage ui rises in the period of time without transient effects and in that the reference voltage Ur is negative if the measuring voltage ui drops accordingly.

Figure 3:
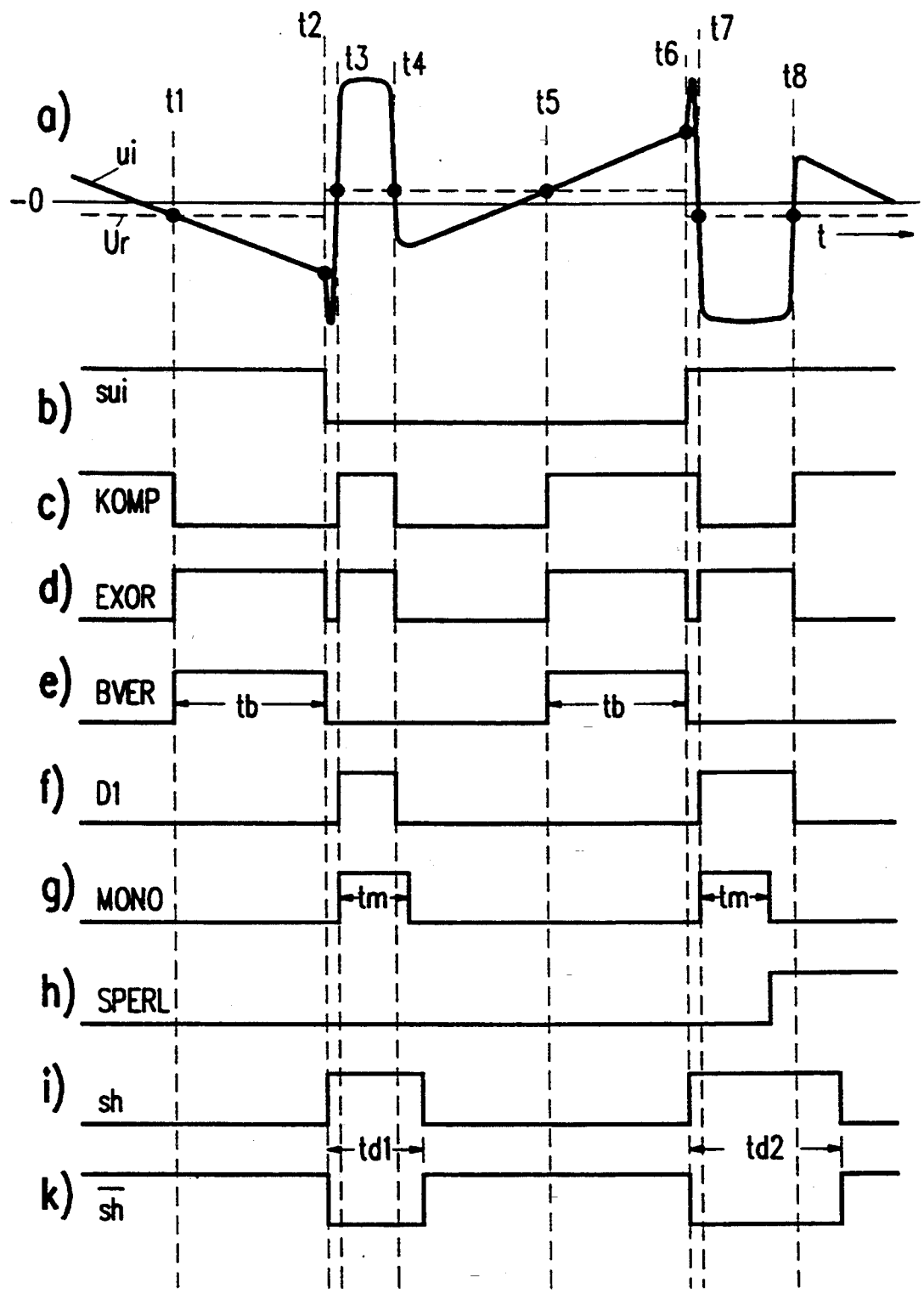

FIG. 3 a) shows, for example, a variation of the measuring voltage ui plotted against time t as well as the reference voltage Ur which has values symmetrically situated around a zero level.

The nominal-phase signal sui produced by the signal shaping circuit 1 known from DE-OS 36 02 227 A1, which signal adopts a high logic level if the reference voltage Ur is negative, and adopts a low logic level if the reference voltage Ur is switched to a positive value, is shown in FIG. 3 b) plotted against time t. As shown in DE-OS 36 02 227 A1, the nominal-phase signal sui here too determines the value of the reference voltage Ur. The nominal-phase signal sui in the position sensing circuit 603 shown in FIG. 1 is applied to a nominal-phase signal input 617 of an exclusive OR gate 618 whose sign signal input 619 is supplied with the sign signal KOMP from output 616 of the comparator 614. The exclusive OR gate 618 thus combines the sign signal KOMP representing the sign of the measuring voltage ui relative to the reference voltage Ur with the nominal-phase signal sui following an exclusive OR combination and presents the result of its output 620 as a comparison signal EXOR. This comparison signal EXOR is shown in FIG. 3 d) plotted against time t. FIG. 3 c) shows the associated time diagram of the sign signal KOMP. The comparison signal EXOR indicates whether the sign signal KOMP and the nominal-phase signal sui have the same or different signs. It has a high, logic level when the signs are different and a low, logic level when the signs are the same. Each transgression by the measuring voltage ui of the given level of the reference voltage Ur and the consequent change of status of the sign signal KOMP causes a pulse of the comparison signal EXOR to be released. In FIG. 3 this is shown at the instants t1 and t5.

The leading edge of the pulse of the comparison signal EXOR (instants t1, t5), which pulse occurs when the measuring voltage ui crosses zero, triggers a first timing circuit included in the position sensing circuit 603 of the control circuit shown in FIG. 1, which timing circuit generates a pulse-shaped signal BVER having pulse duration tb. In FIG. 1 this first timing circuit carries reference character 621 and the pulse duration tb corresponds to the delay interval between the zero crossing and the instant at which the commutation triggered by this zero crossing is advanced. The first timing circuit 621 is thereto connected with its first input 622 to the output 620 of the exclusive OR gate 618 via an AND gate 623. While input 624 of the AND gate 623 is supplied with the comparison signal EXOR, a second input 625, which additionally has an inverting function, is supplied with the shift signal sh which is also applied to the input 13 of the shift register 5 of the signal shaping circuit 1. In this manner the comparison signal EXOR is suppressed from the supply to the input 622 of the first timing circuit 621 when the pulses of the shift signal sh occur. As already explained hereinbefore and will be further explained hereinafter, the durations of the pulses of the shift signal sh are measured in such a way that, as a result of them, all transient effects caused by the commutation are cancelled. In this manner the AND gate 623 suppress all the pulses of the comparison signal EXOR which occur during the transient effects.

The first timing circuit 621 presents on its output 626 after the delay interval tb a signal which is applied to the shift signal generator stage 604 over a line 627 as a trigger signal for triggering a pulse of the shift signal sh. This trigger signal is referenced shausl in FIG. 1.

The shift signal generator stage 604, which is supplied with the trigger signal shausl for triggering generating a pulse of the shift signal sh, comprises two further timing circuits 628, 629 in the embodiment shown in FIG. 1. These timing circuits are connected with their inputs 630 and 631 to the line 627 carrying the trigger signal shausl and with their outputs 632 and 633 to the contacts of a change-over switch 634 whose switch finger is connected via a line 635 to the input 13 of the shift register 5 and to a second input 625 of the AND gate 623. The change-over switch 634 is symbolized as a mechanical device in FIG. 1, but may preferably also be arranged as electronic switch elements.

The timing circuits 628, 629 are preferably arranged as multivibrators which produce a pulse of a high logic level on their outputs 632, 633 which have a low logic level in the state of rest, when their inputs 630, 631 are supplied with a negative i.e. descending signal edge in the trigger signal shausl. The pulse produced by the (second) timing circuit 628 has the pulse duration td1, the pulse produced by the (third) timing circuit 629 has the pulse duration td2. Then td2 exceeds td1. On the line 635 there appears as a pulse of the shift signal either the long pulse (td2) of the third timing circuit 629 or the short pulse (td1) of the second timing circuit 628, depending on the position of the change-over switch 634. Thus the switch 634 achieves that the pulses of the shift signal can optionally be tapped from either timing circuit.

The shift signal generator stage 604 further includes a time comparing stage for comparing the duration of the transient effects caused by the commutation with a time standard and for selecting one of the further timing circuits 628, 629 respectively, for producing the shift signal sh in response to the result of the comparison. For this purpose, the shift signal generator stage 604 is supplied with a signal referenced D1 over a line 636, which signal is shown in FIG. 3 f) by way of example. This signal D2 has a high logic level for the duration of the diode pulse occurring in the measuring voltage ui, and a low logic level for the rest of the time. The signal D1 thus marks the periods in which the diodes in the power circuit are conductive. In the example shown in FIG. 3 the signal D1 has a high logic level between the instants 13 and 14 as well as 17 and 18. The position sensing circuit 603 of the embodiment shown in FIG. 1 comprises an AND gate 637 which has a similar structure to the AND gate 623 for generating signal D1. Its first input 638 is supplied with the comparison signal EXOR from the output 620 of the exclusive OR gate 618, whereas the second input 639 of the AND gate 637, which has an inverting function, is connected to the output 626 of the first timing circuit 621 and receives the signal BVER produced by this timing circuit 621, which signal BVER has a pulse length that corresponds to the predeterminable delay interval tb. The trigger signal shausl is derived from the signal BVER; in FIG. 3 e) it is plotted against time t.

Signal D1 is applied from output 640 of the AND gate 637 via the line 636 to an input 641 of a monostable flip-flop 642 and also to a D-input 643 of a D-flip-flop 644. The monostable flip-flop 642 and the D-flip-flop 644 together form the time comparing stage in the shift signal generator stage 604. The monostable flip-flop 642 then produces the time standard in the form of a pulse having a high logic level and period tm, which signal is referenced MONO and is plotted against time t in FIG. 3 g). Each pulse of the signal MONO which forms the time standard is triggered by the ascending edge of a pulse in the signal D1. The time standard MONO is applied from the output 645 of the monostable flip-flop 642 to a clock input 646 of the D-flip-flop 644 which, with each descending edge of the signal applied to the clock input 646, switches the logic level present at this instant at the D-input 643 through to its output 647, and maintains same until the next descending edge appears at the clock input 646.

The D-flip-flop 644 thus compares the lengths of the pulses in the signal D1 with the time standard MONO in the time comparing stage 642, 644. As is shown in FIG. 3 f) and 3 g) the ascending edge of the signal D1 at the instants t3 and t7 triggers a pulse of the time standard MONO having the pulse duration tm. At the instant of each of the descending edges in the time standard MONO the logic level of the signal D1 is switched through to the output 647 of the D-flip-flop 644 as its output signal SPERL. Since the pulse of the signal D1 shown in FIG. 3 f) between the instants t3 and t4 has already finished at the end of the pulse having the period tm of the time standard MONO, the output signal SPERL of the D-flip-flop 644 at the end of the pulse in the time standard MONO continues to have its low logic level. On the other hand, the time difference between the instants t7 and t8, which feature the length of the next pulse in the signal D1, is always longer than the time period tm. At the instant of the descending edge in the associated pulse in the time standard MONO, the signal D1 has still a high logic level. As a result, the logic level of the output signal SPERL at the end of this pulse having time period tm is changed. The variation of the output signal SPERL is shown in FIG. 3 h) plotted against time t.

The output signal SPERL of the D-flip-flop 644 is also referenced selection signal, because its logic level causes the change-over switch 634 to be actuated. Consequently, in the case of a low logic level of the selector signal SPERL the line 635 is connected to the output 632 of the second timing circuit 628 and the shift signal sh adopts the pulse duration td1. With a high logic level of the selector signal SPERL, on the other hand, the line 635 is connected to the output 633 of the third timing circuit 629 and thus the pulse duration of the pulses of the shift signal sh is fixed at d2. These proportions are shown in FIG. 3 i), and in FIG. 3 k) the inverse of the shift signal sh is shown.

The duration of the pulse in the signal D1, which is determined by the time spacing of the conductive periods of the diode, is a direct measure for the speed of the direct current motor actuated by the control circuit described hereinbefore. Therefore, the signal D1 is also referenced speed signal.

The shift signal sh is applied to the shift register 5 via the input 13, which register is advanced by this shift signal sh and cyclically passes through six states. By means of binary combinations the switch states of the electronic switch elements in the power circuit 2 as well as the nominal-phase signal sui are derived from the signals on the outputs of this shift register 5, as has been extensively described in DE-OS 36 02 27 A1.

In a variant of FIG. 1 the shift signal generator stage 604 may also be arranged for three or more values of the pulse durations of the shift signal sh. Accordingly, the required number of timing circuits (instead of 628, 629) and the number of time standards (in lieu of MONO), can be adapted and the change-over switch 634 extended.

The control circuit shown in FIG. 1 further includes an auxiliary start device by which a substitute trigger signal esh is produced for substituting the triggering of a pulse of the shift signal sh when the trigger signal shausl—derived from the signal BVER from the first timing circuit 621—does not occur for a given period of time. This auxiliary start device comprises a fourth timing circuit 648 and a pulse shaping stage 649 as well as an OR gate 650 further in the circuit, via which gate the substitute trigger signal esh is fed to the line 627 instead of the trigger signal shausl, if the signal BVER from the first timing circuit 621 fails to occur. For this purpose, an input 651 of the fourth timing circuit 648, which circuit may further basically have a similar structure to that of the timing circuit 621, 628, 629 described hereinbefore, is connected to the output 626 of the first timing circuit 621. The pulse shaping stage 649 is directly supplied from the output of the fourth timing circuit 648, so that at the end of the time period ts predetermined by the fourth timing circuit 648 a pulse of the substitute trigger signal esh is presented at the output 652 of the pulse shaping stage 649. The predetermined time period ts is started, for example, at the beginning of a pulse of the signal BVER, but may also be started by the trailing edge of a pulse having the time period tb in the signal BVER in another embodiment comprising a corresponding sensing circuit.

From the output 652 of the pulse shaping stage 649 the substitute trigger signal esh is applied to a first input 653 of the OR gate 650 whose second input 654 is supplied with the signal BVER from the output 626 of the first timing circuit 621. The OR gate 650 is connected with its output 655 to the line 627 for the trigger signal shausl. In this manner either the signal BVER or the substitute trigger signal esh is selectively fed to the line 627 for the trigger signal shausl.

Figure 4:
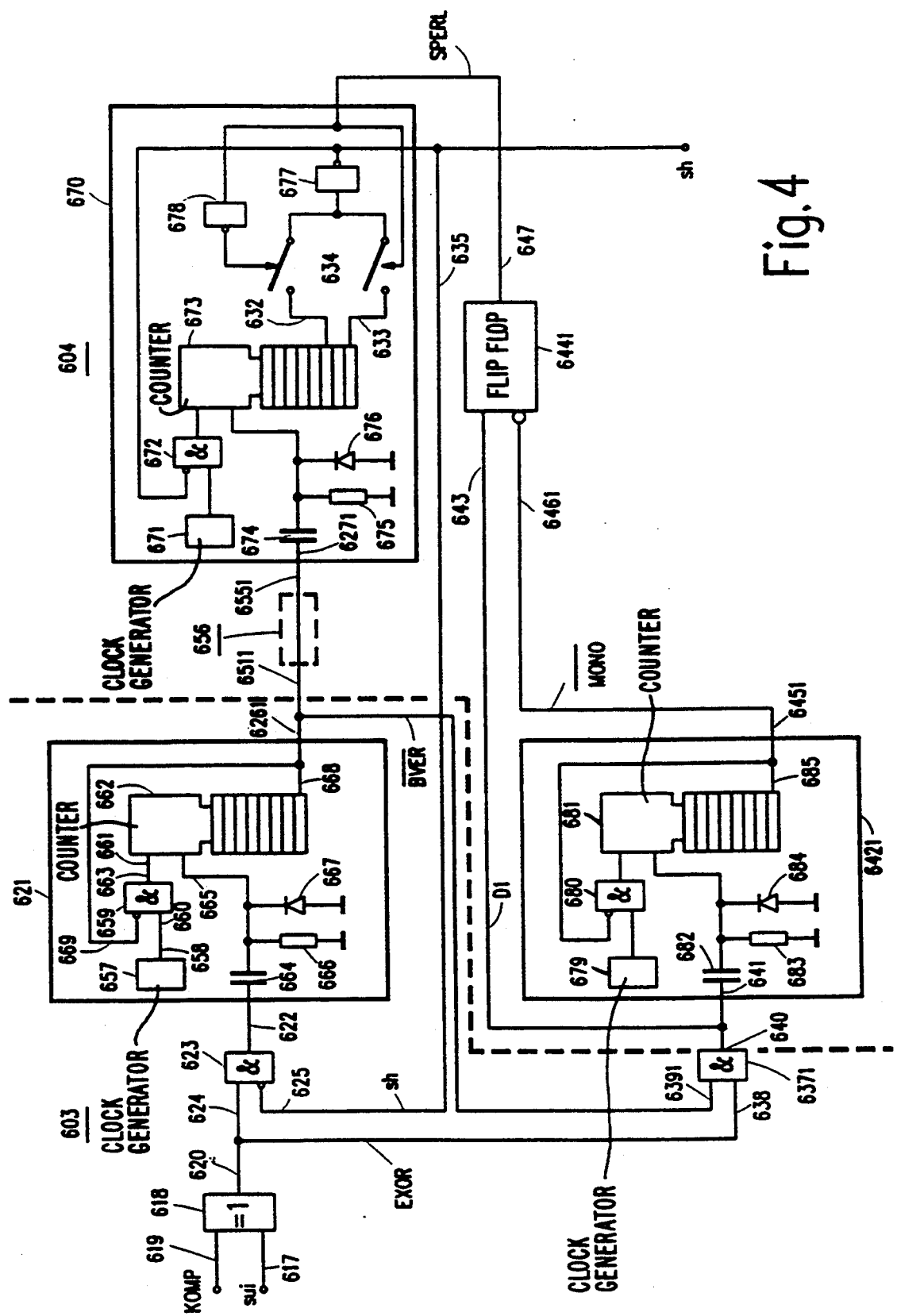
FIG. 4 shows a more detailed circuit diagram of an embodiment for part of the circuit arrangement shown in FIG. 1.

FIG. 4 shows a section of the position measuring circuit 603 and of the shift signal generator stage 604 in a more detailed representation of the embodiment. In this drawing Figure like components are again denoted by like reference characters.

In the embodiment shown in FIG. 4 the first timing circuit 621 comprises a first clock generator 657 which produces on its output 658 preferably a square-wave clock signal. This clock signal is applied to a count input 661 of a first counter 662 via an AND gate 659 which is connected with its first input 660 to the output 658. For this purpose, the output 663 of the AND gate 659 is connected to this count input 661.

The input 622 of the first timing circuit 621 is connected to a reset input 665 of the first counter 662 via a first capacitor 664. A first leakage resistor 666 and a first diode 667 are connected in parallel with the reset input 665 to ground. From the output 668 of the first counter 662 there is a connection to a second, inverted input 669 of the AND gate 659, and a further connection is formed by an output 6261 of the first timing circuit 621 which forms a variant of the output 626 shown in FIG. 1 in the way that at that point the reverse of the signal BVER is available, whereas the output 626 in FIG. 1 presents the signal BVER itself.

As already explained with reference to FIG. 1 and FIG. 3 the input 622 is supplied with the comparison signal EXOR as long as the shift signal sh has a low logic level. The ascending edges at the beginning of the pulse of the comparison signal EXOR passed by the AND gate 623 are applied to the reset input 665 of the first counter 662 via the first capacitor 664 and reset this counter to zero. At the output 668 of the first counter 662 there is then a low logic level available. This releases via the second input 669 the AND gate 659 for the pulses of the clock signal continuously generated by the first clock generator 657. These pulses reach the count input 661 of the first counter 662 which then counts up until a high logic level appears on the output 668. The dimensioning of the first counter 662 and the rate of the clock signal of the first dock generator 657 are tuned to each other, so that between the resetting of the first counter 662 and the appearance of the high logic level on the output 668 exactly the time period tb elapses i.e. the delay interval. During this delay interval tb, the output 668 and thus the output 6261 has a low logic level, whereas for the rest of the time there is a high logic level here. The transition to this high logic level at the end of the delay interval tb again blocks the AND gate 659 and thus interrupts the counting process in the first counter 662 until the next ascending edge appears at the reset input 665. In this manner a pulse of the (inverse of) signal BVER is generated exactly with each ascending edge in the comparison signal EXOR, as long as the shift signal sh has a low level.

The output 6261 of the first timing circuit 621 in FIG. 4 is connected to an input 6271 of a pulse generator 670 which combines, in essence, the functions of the timing circuits 628, 629 as well as the change-over switch 634 described with reference to FIG. 1. The function of the timing circuits 628, 629 are then taken over by an arrangement which comprises a second clock generator 671, an AND gate 672, a second counter 673, a second capacitor 674, a second trigger resistor 675 and a second diode 676. These elements are connected to each other in like manner to the first clock generator 657, the AND gate 659, the first counter 662, the first capacitor 664, the first leakage resistor 666 and the first diode 667 as they are included in the first timing circuit 621, so that reference be made to those embodiments for a further description of the structure and functioning.

Unlike the first counter 662, the second counter 673 has two outputs which correspond to the output 632, 633 respectively, of the timing circuits 628, 629 respectively, as shown in FIG. 1. When the clock signal produced by the second clock generator 671 is upcounted, a shorter pulse of a low logic level accordingly appears at the output 632, and at the output 633 a pulse of accordingly longer duration. The outputs 632 and 633 are thereto combined with appropriate counts of the second counter 673. The pulse at the output 632 has the pulse duration td1, that at the output 633 the pulse duration td2. Via the change-over switch 634, which is shown in FIG. 4 having two mechanical contacts, and via inverter 677 one of the pulses having the duration td1 or td2 reaches the line 635 depending on the switch position of the change-over switch 634 and forms there the shift signal sh.

To adapt the working conditions of the direct current motor to be controlled, the outputs 632 and 633 may be derived from arbitrary counts of the second counter 673. In a highly simple manner, for example, a binary eight counter is used from whose highest count the output 633 and from whose third-highest count the output 632 is derived. The pulse duration td2 is then four times as large as the pulse duration td1.

From the output of the inverter 677 in the pulse generator 670 there is a connection to the inverting input of the AND gate 672 which connection has a similar function to that between output 668 of the first counter 662 and the second input 669 of the AND gate 659 in the first timing circuit 621.

The change-over switch 634 in the pulse generator 670 is actuated from the output 647 of a D-flip-flop 6441 the function of which flip-flop is, in essence, similar to that of D-flip-flop 644 of FIG. 1. In the connection between the output 647 and the switch contact of the change-over switch 637 to be connected to the output 632 in inverter 678 is inserted an inverter 678 by which the actuation of the connections of the change-over switch 634 in opposite directions is defined better.

The shift signal generator stage 604 in the embodiment shown in FIG. 4 further includes a monostable flip-flop 6421 which has a similar function to the monostable flip-flop 642 shown in FIG. 1 to the extent that the signal coming from the output 6451 of the monostable flip-flop 6421 corresponds to the inverted MONO signal, which represents the time standard. But for this signal inversion the output 6451 thus corresponds to the output 645 as shown in FIG. 1. The D-flip-flop 6441 accordingly has a clock input 6461 which corresponds to the clock input 646 of the D-flip-flop 644 in FIG. 1 but for its inverting function.

The input 641 of the monostable element 6421 is connected to the output 640 of an AND gate 6371 which largely corresponds to the AND gate 637 shown in FIG. 1, whose second input, however, in accordance with the supply of the inverted value of the signal BVER, has a non-inverting function and is thus denoted by reference character 6391.

The monostable flip-flop 6421 comprises an arrangement formed by a third clock generator 679, an AND gate 680, a third counter 681, a third capacitor 682, a third leakage resistor 683 and a third diode 684. All these elements are connected to each other in similar manner to the like elements in the first timing circuit 621, so that reference can be made to the above embodiments for an explanation of the further mode of operation. At the output 685 of the third counter 681 which output corresponds to the output 668, the inverse of the signal MONO representing the time standard is produced. This is a pulse having a low, logic level with the pulse duration tm. Its ascending edge is released by the ascending edge of the signal D1 from the output 640 of the AND gate 6371.

In FIG. 4 three clock generators 657, 671 and 679 are shown for clarity. The clock signal, however, can also be derived from a single clock generator.

In the connection between the output 6261 of the first timing circuit 621 and the input 6271 of the pulse generator 670 an auxiliary starter device 656 can be inserted as desired, which forms the function of the fourth timing circuit 648, of the pulse generator stage 649 and of the OR gate 650 shown in FIG. 1. This auxiliary starter device 656 has an input 6511 and an output 6551. An embodiment for this device which represents a variant of said arrangements shown in FIG. 1 is shown in FIG. 5.

The input 6511 of the auxiliary starter device 656 shown in FIG. 5 is connected via an inverter 686 to a line junction which carries the same signal as the input 651 of the fourth timing circuit 648 in FIG. 1 and thus carries the same reference character. Accordingly, the output 6551 of the auxiliary starter device 656 shown in FIG. 5 is supplied via a further inverter 687 by a line which carries the same signal as the output 655, that is to say, the trigger signal shausl.

In the embodiment shown in FIG. 5 a fourth clock generator 6481 and a fourth counter 6482 are substituted for the fourth timing circuit 648. The output 688 of the fourth clock generator 6481 is connected to a count input 689 of the fourth counter 6482. There is a connection between the input 651 and a reset input 690 of the fourth counter 6482. The fourth counter 6482 cyclically counts with the clock signal applied to its count input 689 by the fourth clock generator 6481, while the dimensioning is selected in such a manner that a cycle corresponds to the given time duration ts which duration is also measured by the fourth timing circuit 648 shown in FIG. 1. In response to the clock signal the fourth counter 6482 produces on its output 691 pulses spaced in time by ts and having a high, logic level which are fed to an input 692 of the pulse shaping stage 649. This stage produces on its output, as described hereinbefore, the substitute trigger signal esh and applies this signal to the first input 653 of an OR gate 6501 which, in the embodiment shown in FIG. 5, substitutes for the OR gate 650 in FIG. 1. The second input 654 of the OR gate 6501 is connected to the input 651. In this manner the pulses of the signal BVER reach the output 655 as the trigger signal shausl and are simultaneously used for resetting the fourth counter 6482 through the reset input 690. During normal operation the fourth counter 6482 does not reach its final count, but is already reset before that instant by a pulse of the signal BVER, so that in the pulse shaping stage 649 no pulse is triggered and thus no substitute trigger signal esh occurs. On the other hand, if the pulses of the signal BVER fail to occur, the pulse shaping stage 649 triggers a pulse of the substitute trigger signal esh after the given period of time ts has elapsed.

Figure 6:
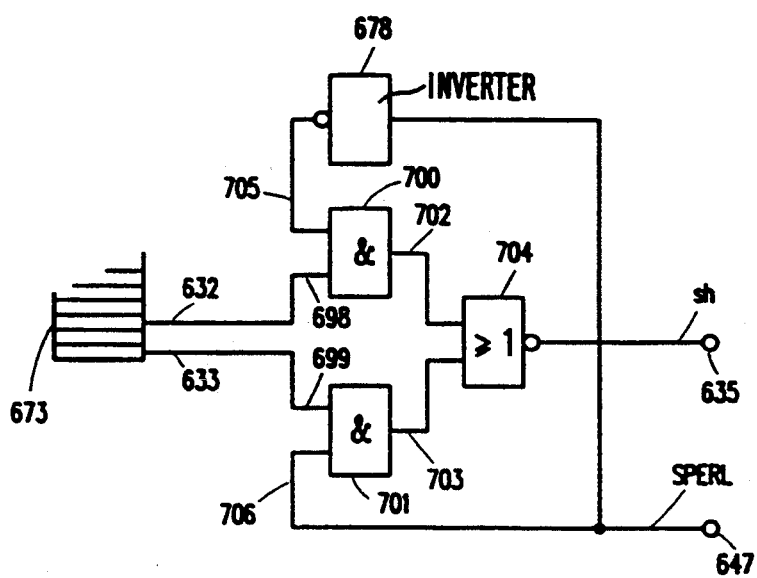
FIG. 6 shows an embodiment for a detail of the circuit arrangement shown in FIG. 4.

FIG. 6 shows an embodiment for the change-over switch 634 comprising simple electronic logic gates. For this purpose, each of the outputs 632, 633 is connected to a first input 698, 699 respectively, of an AND gate 700, 701 respectively, whose outputs 702, 703 respectively, are combined with an input each of a NOR gate 704. The output of the NOR gate 704 is connected to the line 635 for the shift signal sh. A second input 705 of the AND gate 700 is connected to the output of the inverter 678, a second input 706 of the AND gate 701 is connected to the output 647. In this manner the selecting signal SPERL alternately releases either AND gate 700, 701 for the pulses from the outputs 632, 633 respectively.

Figure 7:
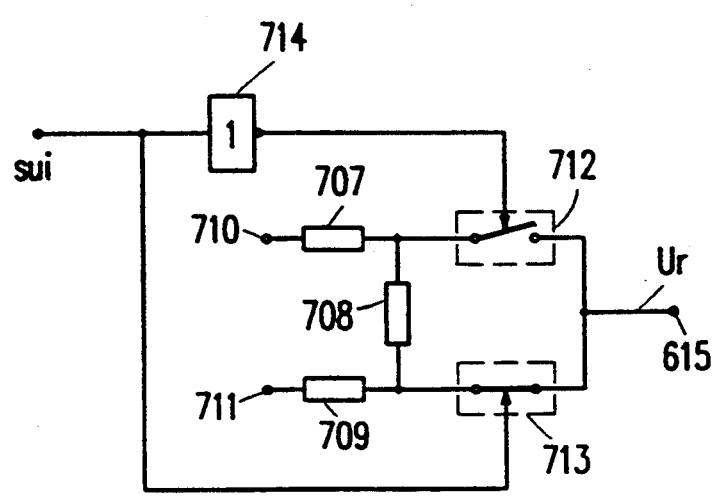
FIG. 7 shows an example of an embodiment for an arrangement for generating a reference voltage.

In FIG. 7 an embodiment is shown for a circuit by which the reversible reference voltage Ur can be generated as a function of the nominal-phase signal sui. This arrangement comprises a reference voltage divider formed by three series-arranged resistors 707, 708, 709 which divider is inserted between two reference voltage terminals 710, 711. The reference voltage terminals 710, 711 may be supplied, for example, with a positive and a negative supply voltage or also a positive supply voltage and ground potential. From each of the terminals of the resistors 707, 708 or 708, 709 respectively, a connection is formed by a switch element 712, 713 respectively, to the reference voltage input 615 of the comparator 614. The switch element 712 is switched via an inverter 714, the switch element 713 is switched directly by the nominal-phase signal sui. The switch elements 712, 713 are shown as mechanical switches in FIG. 7 for clarity, but may also comprise electronic modules.

What is claimed is:

1. An improved circuit arrangement for commutating drive current in a collectorless direct current motor without using a commutation sensor, the motor drive current being switched from one motor winding to a next motor winding in response to a pulse-shaped shift signal that is derived each time from an induced voltage signal generated in a motor winding that is not being energized at that time by drive current, the improvement comprising:

means for electronically determining from the induced voltage signal which one of a plurality of predetermined speed ranges the motor is currently operating within;

means for generating the pulse-shaped shift signals with any one of a plurality of different predetermined pulse widths, each different possible pulse width corresponding to a maximum time for transient effects of a prior commutation to subside in a corresponding speed range;

means responsive to the means for determining the current speed range for controlling the shift signal generating means to generate shift signals with a pulse width that corresponds to the determined current speed range; and means for preventing a subsequent commutation from being triggered during a time corresponding to the width of each pulse-shaped shift signal.

2. An improved circuit arrangement as defined in claim 1 wherein said means for electronically determining the current motor speed range comprises means for sensing a conductive time period of a diode used to switch drive current from a motor winding.

3. An improved circuit arrangement as defined in claim 1 wherein said means for generating pulse-shaped shift signals generates shift signals with any one of only two different predetermined pulse widths.

* * * * *